April 24, 1928.

R. BOLDT

SEAT FOR GIRDERS AND BEAMS

Filed May 18, 1927

INVENTOR.
Richard Boldt,
BY
ATTORNEY.

April 24, 1928.
R. BOLDT
1,667,619
SEAT FOR GIRDERS AND BEAMS
Filed May 18, 1927
2 Sheets-Sheet 2
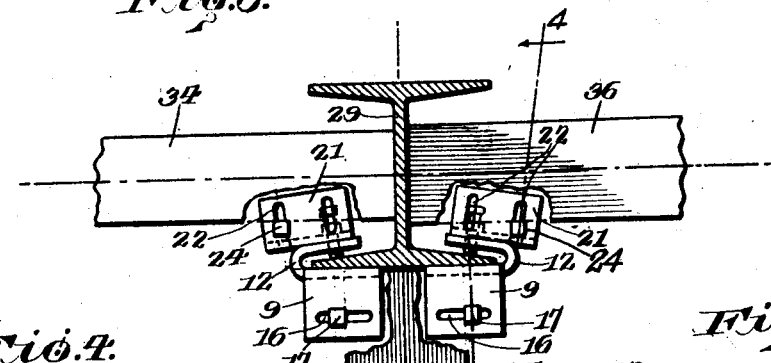
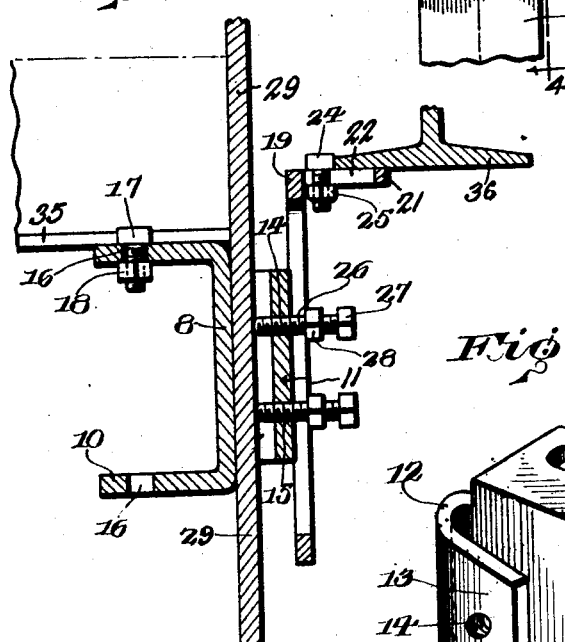
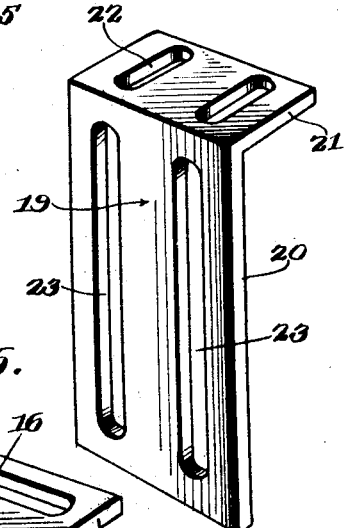
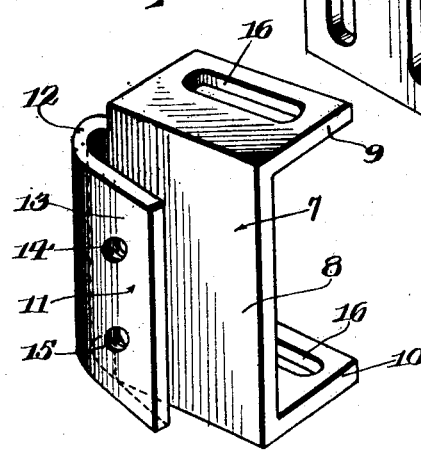
INVENTOR.
Richard Boldt,
BY
Geo. F. Kimmel
ATTORNEY.

Patented Apr. 24, 1928.

1,667,619

UNITED STATES PATENT OFFICE.

RICHARD BOLDT, OF SAN FRANCISCO, CALIFORNIA.

SEAT FOR GIRDERS AND BEAMS.

Application filed May 18, 1927. Serial No. 192,310.

This invention relates to an adjustable, removable seat for structural iron work, and has for its object to provide, in a manner as hereinafter set forth, a removable seat structure for supporting cross members in position to be welded or connected to a column without the employment of the well-known seat or erection angles which are welded permanently to the structural irons.

A further object of the invention is to provide, in a manner as hereinafter set forth, a seat structure for supporting cross members in position to be welded or connected to columns in structural iron work and with the seat structure removable after the welding or connecting operation.

A further object of the invention is to provide, in a manner as hereinafter set forth, a seat structure for supporting cross members in position to be welded or connected to columns in structural iron work and with said structure adjustable whereby it can be employed with structural iron of different sizes.

A further object of the invention is to provide, in a manner as hereinafter set forth, a seat structure for supporting I-beams or channel-beams in position to be welded or otherwise connected to uprights, and with the structure capable of being adjusted for beams of different sizes not only with respect to the flanges of the beams, but also to the height thereof, and further whereby such structure after the beams have been connected in position can be conveniently removed for further use.

Further objects of the invention are to provide, in a manner as hereinafter set forth, an adjustable, removable seat structure for the purpose referred to, which is comparatively simple in its construction, strong, durable, compact, expeditiously set up in supporting position, conveniently adjusted, thoroughly efficient in its use, and comparatively inexpensive to manufacture.

With the foregoing and other objects in view the invention consists of the novel construction, combination, and arrangement of parts as hereinafter more specifically described and illustrated in the accompanying drawings wherein is shown an embodiment of the invention, but it is to be understood that changes, variations, and modifications can be resorted to which fall within the scope of the claims hereunto appended.

In the drawings wherein like reference characters denote corresponding parts throughout the several views:—

Fig. 3 is a fragmentary view in top plan of the structure and showing the adaptation thereof in connection with a plurality of cross members extending from an upright.

Fig. 4 is a section on line 4—4, Fig. 3, upon an enlarged scale

Fig. 5 is a perspective view of one of the sections of the structure.

Fig. 6 is a perspective view of the other section of the structure.

Figure 1:
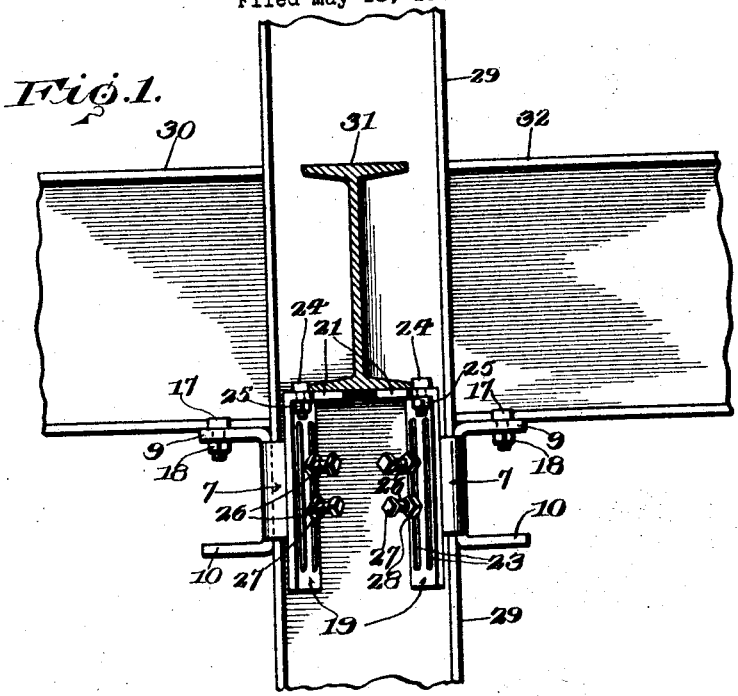
Fig 1 is a side elevation of an adjustable, removable seat structure in accordance with this invention and showing the adaptation thereof with respect to an upright and a pair of cross members or beams.

An adjustable, removable seat structure, in accordance with this invention and for use in connection with structural iron work, comprises a combined supporting and carrying section or element, hereinafter termed element, a supporting section, a set of holdfast devices, and retaining devices.

The combined supporting and carrying element is referred to generally by the reference character 7 and which comprises a rectangular body portion 8 provided at its ends with a pair of right-angularly disposed extensions 9, 10 arranged in superposed relation. Formed integral with one side edge of the body portion 8 and of a width less than the height of the latter, as well as positioned equidistant from each end of said body portion 8, is a coupling wing 11 bent to oppose that face of the body portion 8 opposite that face from which the extensions 9, 10 project. The clamping wing 11 is of a length to extend transversely of and substantially across the body portion 8. The wing 11 includes a curved portion 12 which merges into the body portion 8 and said wing 11 further includes a portion 13 which opposes, but is spaced from, the body portion 8 and is formed with a pair of openings 14, 15 each arranged adjacent the side edge of the part 13 and positioned in proximity to the end edge of the wing 11. The walls of the openings 14, 15 are threaded The extension 9, as well as the extension 10 is of rectangular contour, and extending lengthwise of said extensions are slots 16 having their ends arranged in close proximity to the end edges of the extensions. Selectively positioned in one of the slots 16 is a retaining device consisting of a short headed bolt 17 provided with a securing nut 18. The head of the bolt 17 is seated upon the outer side face of the extension.

The supporting section is referred to generally by the reference character 19 and it consists of a rectangular body portion 20 of greater length than the body portion 8. The body portion 20 terminates at its upper end in a right-angularly disposed rectangular extension 21 provided with a slot 22 adjacent each end edge thereof. In proximity to each side edge of the body portion 20 there is arranged a lengthwise extending slot 23. The slots 22 are of less length than the slots 16 and the slots 23 are of greater length than the slots 16 and 22. Selectively mounted in one of the slots 22 is a retaining device consisting of a headed bolt 24 provided with a securing nut 25. The head of the bolt 24 seats upon the upper face of the extension 21.

Selectively mounted in one of the slots 23 is a set of holdfast devices and each of which consists of a cylindrical bar of appropriate length and which is indicated at 26. The bar 26 is peripherally threaded from end to end. Integral with the outer end of the bar 26 is a head 27, and threadably engaging with the bar 26 is a clamping nut 28. The holdfast devices coact with the threaded walls of the openings 14, 15 formed in the wing 11 and abut against an upright to provide for the clamping of the combined supporting and coupling sections in stationary position. The nuts 28 of the holdfast devices abut against that face of the body portion 20 from which the extensions 21 project. The extensions 9, 10 and 21 provide seats or supports for the cross members for positioning them relative to an upright so said cross members can be welded to the upright and after the welding or connecting operation the seat structure is removed so it can be employed again.

A flanged column or upright is indicated at 29 and in Fig. 1 the cross members 30, 31 and 32 in the form of I-beams are illustrated as supported in position with respect to the column 29 by a pair of adjustable, removable seats in accordance with this invention. The cross member 31 is of less height than the cross members 30, 32. The cross members 30, 32 are mounted on the extensions 9 of a pair of combined supporting and coupling elements and the cross members 31 are mounted on the extensions 21 of a pair of supporting sections. The retaining devices carried by the flanges 9 abut against the edges of the lower flanges of the cross members 30, 32 and the retaining devices carried by the extensions 21 abut against the edges of the lower flange of the cross member 31. The supporting sections 19 have been vertically adjusted in a manner so as to position the base flange of the cross members 31 above the base flange of the cross members 30, 32, but with the top flange of the cross members 31 flush with respect to the top flanges of the cross members 30, 32.

Figure 2:
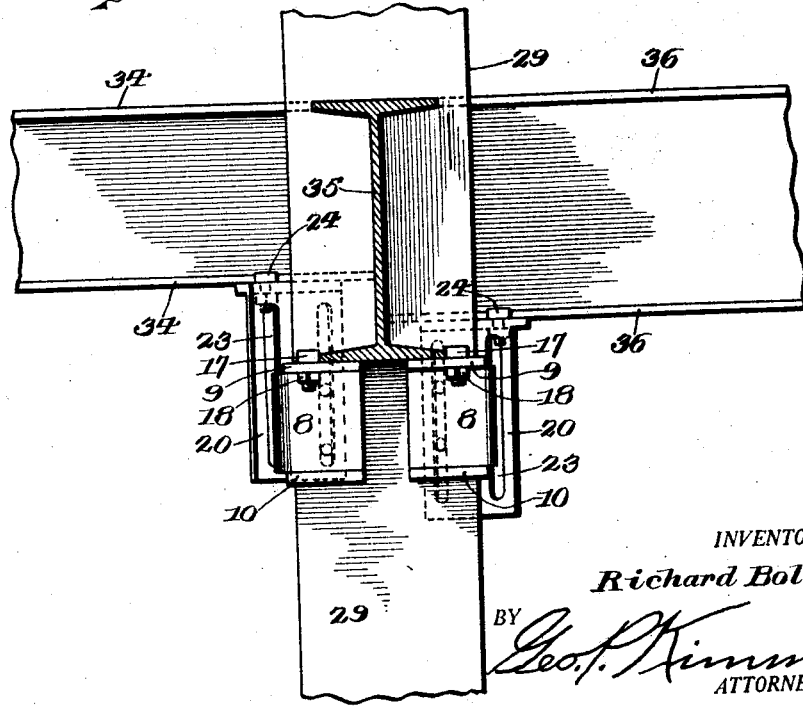
Fig. 2 is a front elevation of an adjustable, removable seat structure in accordance with this invention and showing the adaptation thereof with respect to an upright and a plurality of cross members or beams.

With reference to Fig. 2 the cross members 34, 35 and 36, in the form of I-beams are illustrated in position with respect to the column 29 and are supported in such position by the pair of seat structures in accordance with this invention. The cross member 34 is supported by the extensions 21. The cross member 36 is supported by the extensions 21 and the cross member 35 is supported by the extensions 9.

With reference to Fig. 3 the column or upright is also indicated at 29 and the cross members at 34, 35 and 36, and Fig. 3 is a base plan of the arrangement shown in Fig. 2.

If but one cross member is to be connected in position a pair of seat structures are to be employed. If two or more cross members are to be supported in position relative to the column 29, four or six seat structures are to be employed.

The combined supporting and carrying element is clamped to a flange of the column 29 by the holdfast devices which extend through a slot 23 and openings 14, 15. The supporting structure 19 is vertically adjustable relative to the element 7 and is furthermore adjustable inwardly and outwardly with respect to said element 7. The inward and outward adjustments of the section 19 is provided for by the pair of slots 23, in connection with the set of holdfast devices which extend through the openings 14, 15 of the element 7. The retaining devices act as means for centering the cross members as said devices are adjustable in the slots 16 and 22. After the seat structure has been clamped in supporting position to the column 29 and performed its function in supporting the cross member the said structure can be expeditiously removed from the column 29 by loosening the set of holdfast devices which are employed for detachably clamping it in position. The retaining devices are arranged to engage the edges of the base flanges of the cross members. The extensions 16 provide means for supporting cross members extending at right angles with respect to the cross members supported by the extensions 21. The providing of the body portion 7 with an upper and a lower extension, or the extensions 9 and 10, permits of the elements 7 to be employed from either side of the column 29.

The combined supporting and carrying elements 7 are adapted to be coupled against the flanges of the column 29 and project outwardly therefrom. The supporting structures 19 are adapted to oppose and project outwardly from the body of the column 29 when said structures 19 are coupled to the elements 7. As the structures 19 have the body portions 20 thereof, when connected to the inclined coupling wings, 11 abut said wings, the said structures 19 are disposed at an angle with respect to the elements 7. As shown in Fig. 3 the supporting structures 19 are disposed at opposite inclinations with respect to each other.

It is thought the many advantages of an adjustable, removable seat structure, in accordance with this invention for the purpose set forth, can be readily understood, but although the preferred embodiment of the invention is as illustrated and described, yet it is to be understood that changes in the details of construction can be had which will fall within the scope of the invention as claimed.

What I claim is:

1. An adjustable, removable seat structure for supporting structural irons comprising a combined supporting and coupling element including a seat for a structural iron, a supporting section including a seat for a structural iron, and means common to said element and section for detachably clamping them together and for detachably clamping said element in position whereby said element and section are removably secured in supporting position for the structural iron.

2. An adjustable, removable seat structure for supporting structural irons comprising a combined supporting and coupling element including a seat for a structural iron, a supporting section including a seat for a structural iron, means common to said element and section for detachably clamping them together and for detachably clamping said element in position whereby said element and section are removably secured in supporting position for the structural iron, said seats disposed at an angle to each other for supporting angularly disposed structural irons.

3. An adjustable, removable seat structure for supporting structural irons comprising a combined supporting and coupling element including a seat for a structural iron, a supporting section including a seat for a structural iron, means common to said element and section for detachably clamping them together and for detachably clamping said element in position whereby said element and section are removably secured in supporting position for the structural iron, and means carried by said means for centering the irons mounted thereon.

4. An adjustable, removable seat structure for supporting structural irons comprising a combined supporting and coupling element including a seat for a structural iron, a supporting section including a seat for a structural iron, means common to said element and section for detachably clamping them together, and for detachably clamping said element in position whereby said element and section are removably secured in supporting position for the structural iron, said seats disposed at an angle to each other for supporting angularly disposed structural irons, and means carried by said seats for centering the irons mounted thereon.

5. An adjustable, removable seat structure for supporting structural irons comprising a combined supporting and coupling element including a seat for a structural iron, a supporting section including a seat for a structural iron, means common to said element and section for detachably clamping them together and for detachably clamping said element in position whereby said element and section are removably secured in supporting position for the structural iron, and said supporting sections provided with means for the lengthwise adjustment thereof relative to said combined supporting and coupling element.

6. An adjustable, removable seat structure for supporting structural irons comprising a combined supporting and coupling element including a seat for a structural iron, a supporting section including a seat for a structural iron, means common to said element and section for detachably clamping them together, and for detachably clamping said element in position whereby said element and section are removably secured in supporting position for the structural iron, said seats disposed at an angle to each other for supporting angularly disposed structural irons, and said supporting sections provided with means for the lengthwise adjustment thereof relative to said combined supporting and coupling element.

7. An adjustable removable seat structure for supporting structural irons comprising a combined supporting and coupling element including a seat for a structural iron, a supporting section including a seat for a structional iron, means common to said element and section for detachably clamping them together and for detachably clamping said element in position whereby said element and section are removably secured in supporting position for the structural iron, means carried by said means for centering the irons mounted thereon, and said supporting sections provided with means for the lengthwise adjustment thereof relative to said combined supporting and coupling element.

8. An adjustable, removable seat structure for supporting structural irons comprising a combined supporting and coupling element including a seat for a structural iron, a supporting section including a seat for a structural iron, means common to said element and section for detachably clamping them together, and for detachably clamping said element in position whereby said element and section are removably secured in supporting position for the structural iron, said seats disposed at an angle to each other for supporting angularly disposed structural irons, means carried by said seats for centering the irons mounted thereon, and said supporting sections provided with means for the lengthwise adjustment thereof relative to said combined supporting and coupling element.

9. An adjustable, removable seat structure for supporting structural irons comprising a combined supporting and coupling element including a seat for a structural iron, a supporting section including a seat for a structural iron, means common to said element and section for detachably clamping them together and for detachably clamping said element in position whereby said element and section are removably secured in supporting position for the structural iron, and said supporting sections provided with means to provide for the adjustment thereof inwardly and outwardly with respect to said combined supporting and coupling elements.

10. An adjustable, removable seat structure for supporting structural irons comprising a combined supporting and coupling element including a seat for a structural iron, a supporting section including a seat for a structural iron, means common to said element and section for detachably clamping them together and for detachably clamping said element in position whereby said element and section are removably secured in supporting position for the structural iron, said seats disposed at an angle to each other for supporting angularly disposed structural irons, and said supporting sections provided with means to provide for the adjustment thereof inwardly and outwardly with respect to said combined supporting and coupling element.

11. An adjustable, removable seat structure for supporting structural irons comprising a combined supporting and coupling element including a seat for a structural iron, a supporting section including a seat for a structural iron, means common to said element and section for detachably clamping them together, and for detachably clamping said element in position whereby said element and section are removably secured in supporting position for the structural iron, means carried by said means for centering the irons mounted thereon, and said supporting sections provided with means to provide for the adjustment thereof inwardly and outwardly with respect to said combined supporting and coupling element.

12. An adjustable, removable seat structure for supporting structural irons comprising a combined supporting and coupling element including a seat for a structural iron, a supporting section including a seat for a structural iron, means common to said element and section for detachably clamping them together, and for detachably clamping said element in position whereby said element and section are removably secured in supporting position for the structural iron, said seats disposed at an angle to each other for supporting angularly disposed structural irons, means carried by said seats for centering the irons mounted thereon, and said supporting sections provided with means to provide for the adjustment thereof inwardly and outwardly with respect to said combined supporting and coupling element.

13. An adjustable, removable seat structure for supporting structural irons comprising a combined supporting and coupling element including a seat for a structural iron, a supporting section including a seat for a structural iron, means common to said element and section for detachably clamping them together, and for detachably clamping said element in position whereby said element and section are removably secured in supporting position for the structural iron, said seats disposed at an angle to each other for supporting angularly disposed structural irons, said supporting sections provided with means for the lengthwise adjustment thereof relative to said combined supporting and coupling element, and the means of said supporting section to provide for the adjustment thereof relative to said combined supporting and coupling element and further providing for the adjustment of said supporting section outwardly and inwardly with respect to said element.

14. An adjustable removable seat structure for supporting structural irons, comprising a combined supporting and coupling element including a seat for a structural iron, a supporting section including a seat for a structural iron, means common to said element and section for detachably clamping them together and for detachably clamping said element in position whereby said element and section are removably secured in supporting position for the structural iron, means carried by said means for centering the irons mounted thereon, said supporting sections provided with means for the lengthwise adjustment thereof relative to said combined supporting and coupling element, and the means of said supporting section to provide for the adjustment thereof relative to said combined supporting and coupling element and further providing for the adjustment of said supporting section outwardly and inwardly with respect to said element.

15. An adjustable, removable seat structure for supporting structural irons comprising a combined supporting and coupling element including a seat for a structural iron, a supporting section including a seat for a structural iron, means common to said element and section for detachably clamping them together, and for detachably clamping said element in position whereby said element and section are removably secured in supporting position for the structural iron, said seats disposed at an angle to each other for supporting angularly disposed structural irons, means carried by said seats for centering the irons mounted thereon, said supporting sections provided with means for the lengthwise adjustment thereof relative to said combined supporting and coupling element, and the means of said supporting section to provide for the adjustment thereof relative to said combined supporting and coupling element and further providing for the adjustment of said supporting section outwardly and inwardly with respect to said element.

16. An adjustable, removable seat structure for supporting structural irons comprising a combined supporting and coupling element including a seat for a structural iron, a supporting section including a seat for a structural iron, means common to said element and section for detachably clamping them together and for detachably clamping said element in position whereby said element and section are removably secured in supporting position for the structural iron, said supporting sections provided with means to provide for the adjustment thereof inwardly and outwardly with respect to said combined supporting and coupling element, and the means of said supporting section to provide for the adjustment thereof relative to said combined supporting and coupling element and further providing for the adjustment of said supporting section outwardly and inwardly with respect to said element.

In testimony whereof, I affix my signature hereto.

RICHARD BOLDT.